H. SCOTT-PAINE.
FLYING BOAT OR OTHER LIGHT MARINE VESSEL.
APPLICATION FILED APR. 22, 1920.
1,353,669.
Patented Sept. 21, 1920.
5 SHEETS—SHEET 1.
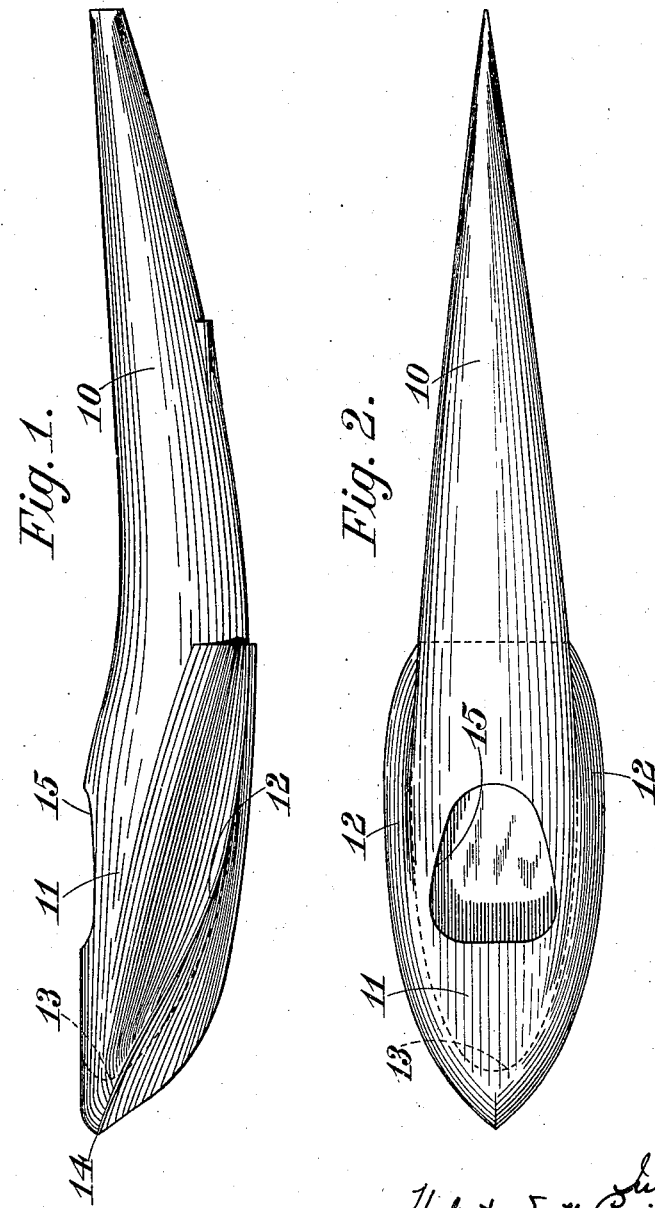

H. SCOTT-PAINE.
FLYING BOAT OR OTHER LIGHT MARINE VESSEL.
APPLICATION FILED APR. 22, 1920.
1,353,669.
Patented Sept. 21, 1920.
5 SHEETS—SHEET 2.
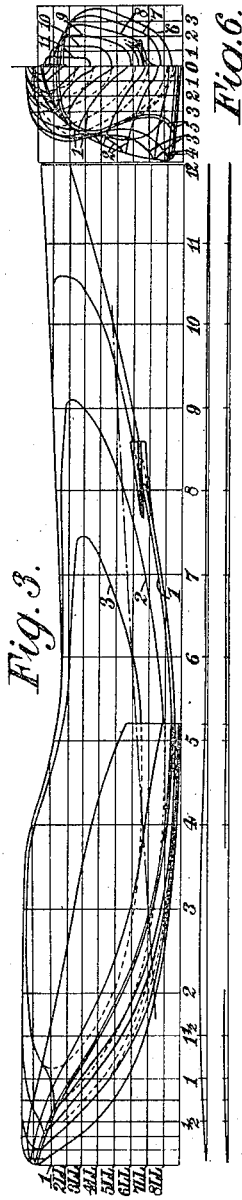
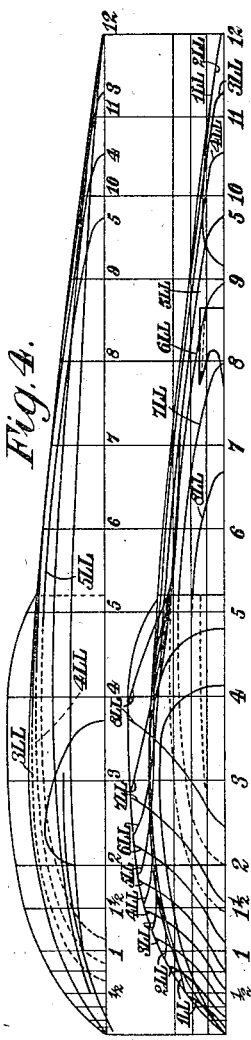

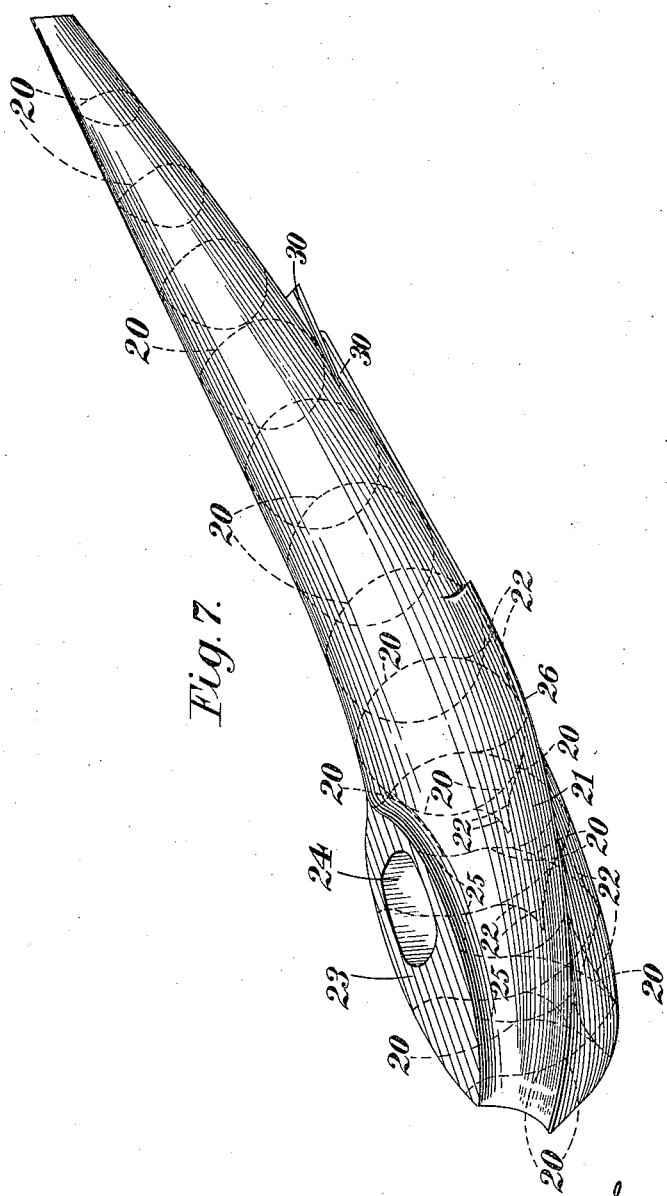

H. SCOTT-PAINE.
FLYING BOAT OR OTHER LIGHT MARINE VESSEL.
APPLICATION FILED APR. 22, 1920.

1,353,669.

Patented Sept. 21, 1920.
5 SHEETS—SHEET 4.

H. SCOTT-PAINE.
FLYING BOAT OR OTHER LIGHT MARINE VESSEL.
APPLICATION FILED APR. 22, 1920.
1,353,669.
Patented Sept. 21, 1920.
5 SHEETS—SHEET 5.
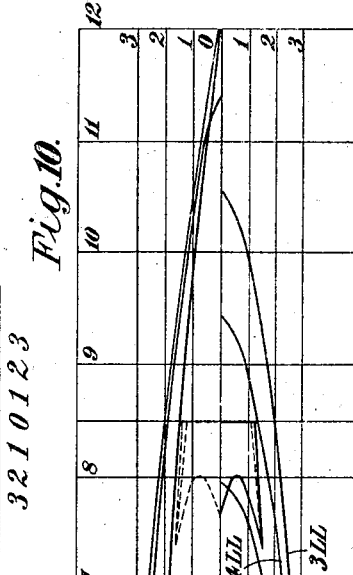
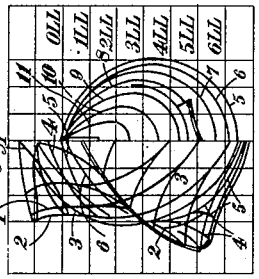
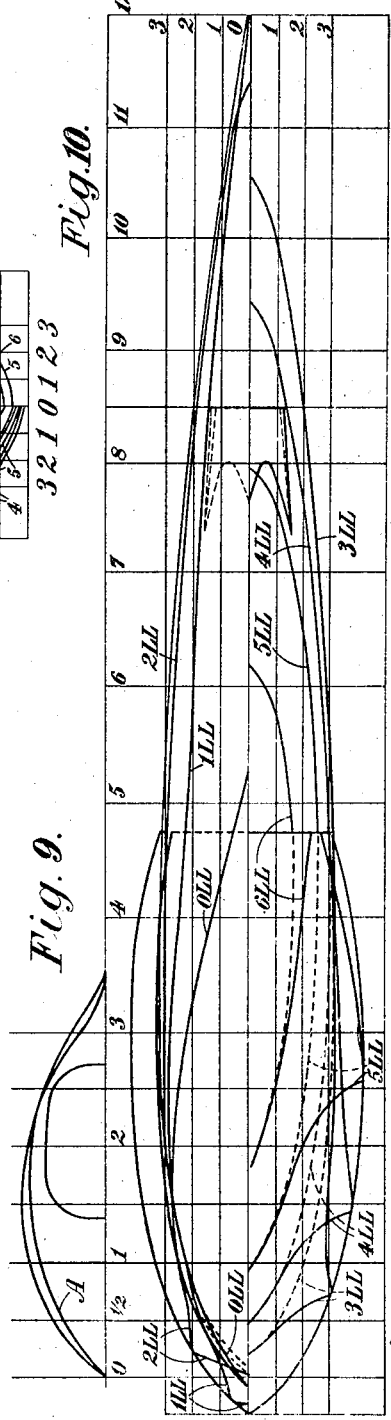

UNITED STATES PATENT OFFICE.

HUBERT SCOTT-PAINE, OF SOUTHAMPTON, ENGLAND.

FLYING-BOAT OR OTHER LIGHT MARINE VESSEL.

1,353,669.  Specification of Letters Patent. Patented Sept. 21, 1920.

Application filed April 22, 1920. Serial No. 375,881.

*To all whom it may concern:*

Be it known that I, HUBERT SCOTT-PAINE, a subject of the King of England, residing at Woolston, Southampton, in the county of Hants, England, have invented certain new and useful Improvements in Flying-Boats or other Light Marine Vessels, of which the following is a specification.

This invention is for improvements in or relating to flying boats or other light marine vessels and has for its object to provide such a construction of vessel as will prevent entirely or to a very large extent the shipping of water over the bow when the vessel is driven at a high speed.

The invention is applied to vessels of the type having laterally extending side-wings or steps flared as to their underside at or above the level of the water-line along the fore part of the vessel, and according to this invention the said side-wings are extended forward and around the nose to meet one another, the said extension being flared on its underside as are the steps. There is thus provided at the front of the vessel above the water-line a forwardly-projecting portion flared as to its underside in such a manner as to throw the water or spray forward and sidewise when the vessel is traveling at a high speed.

In the preferred form of the invention, the hull of the boat is of circular or approximate circular cross-section and the step, formed as above described, is secured to the skin of the hull proper.

This invention also comprises a boat having along the forepart on each side of the hull an angular chine which rises from the after end of the said chine toward the bow where the two chines meet, a concave surface extending from the chine to meet the hull bottom and above each chine a concave surface rising from the chine and flared outwardly at the top to meet the gunwale. This concave surface may also if desired, be flared outwardly at the bottom to meet the chine.

In the accompanying drawings which illustrate two embodiments of the invention:—

Figure 1 is a side elevation of the hull of a flying-boat;

Fig. 2 is a plan thereof;

Figs. 3, 4, 5 and 6 show the lines of a vessel as illustrated in Figs. 1 and 2;

Fig. 7 is a perspective view of another construction of the hull for a flying boat, and Figs. 8, 9, 10 and 11 show the lines of this hull in the usual manner.

Like reference characters indicate like parts throughout the drawings.

Figure 8:

Referring to Figs. 1 to 6 of these drawings, the hull 10 of the boat is of approximately circular cross-section as to the forward end 11, and there is secured on each side of the hull a laterally extending step 12. This step is inclined in a fore and aft direction, being highest at the bow 13 where it is above the water line, and it extends aft and downward across the water line terminating at, say, one-third or one-half of the total length of the vessel from the bow.

In the particular construction illustrated, the hull proper constitutes a complete unit in itself independently of the steps or lateral projections 12, and the bow of the hull proper is indicated at 13.

According to this invention, the side wings 12 in addition to extending laterally from the hull extend forward and around the bow 13, as at 14, to form a projection extending forwardly from the nose or bow 13 of the hull proper.

These steps 12 are concave as to their undersides the concave curve being preferably merged into the bottom of the hull. This concave formation is maintained where the steps extend around the nose of the hull.

The upper surfaces of the steps may be given any desired formation according to the size of the hull and also according to the precise location of the step on the hull, but it is preferred to make it concave and also flared outwardly where it meets the gunwale. Such a construction is illustrated in Figs. 7–11 in which the section of the hull proper is indicated by the lines 20, and the step is indicated at 21. Section lines showing the formation of the said step are marked 22. The step 21 is inclined as before, in a fore-and-aft direction, being highest at the bow where it is above the normal water-line of the vessel and extending downward and across the water-line. The deck of the vessel is indicated at 23 and the cockpit at 24. According to this modification of the invention, the hull is flared outwardly, as shown at 25, to meet the gunwale or deck-line.

The step 21 is of such dimensions as to project laterally beyond the width of the hull proper and the underside of the step is formed as a concave surface, such surface being merged into the curve of the bottom of the hull. In some constructions the portion hereinbefore referred to as the hull proper may be constructed as a complete unit, and the step 21 may be secured on to the continuous planking of the hull proper. In other cases the hull proper may be defined only by the framing, so that the continuous planking extends from the hull over the step.

The upper side of the step 21, that is to say the portion lying between the chine 26 and the hull, may be given any desired shape, but it is preferably made somewhat concave; with this arrangement, near the bow, this curve merges into the outwardly flared portion 25 of the hull proper.

The hull may be provided with steps 30 in the usual manner to assist it in leaving the water.

It will be seen that when a vessel constructed in accordance with this invention, or as illustrated in the accompanying drawings, is afloat and traveling, the concave underside of the steps 12 or 21, together with their fore-and-aft downward inclination, tends to throw the water and spray aside from the vessel. The special feature of this invention, the forwardly projecting step at the bow also throws off water by reason of its concave underside. As heretofore constructed vessels in which this forwardly extending projection is not used are always liable to ship water directly over the bow, for the side projections only prevent the shipping of water over the side of the fore part of the vessel; this objection is obviated by the present invention.

But, however, conditions may sometimes be such that the water overflows the step, and in this case the second construction illustrated, should be used. Any water which tends to travel up the hull proper, is met by the flared portion 25 below the deck-line and this throws the water off. The result is that the liability of shipping water into the cockpit or interior of the vessel is very much reduced, or entirely obviated.

It will be appreciated that the invention may be applied to hulls or vessels of any size. The constructions illustrated are of comparatively small hulls having as the only opening a cockpit, but it will be appreciated that the invention may also be applied to vessels such as motor-boats, which may be wholly or largely not decked over.

The invention, therefore, provides a construction of hull for flying-boats and other light marine vessels in which the liability of shipping water and spray into the interior of the hull is very much minimized or entirely removed.

It has before been proposed to provide a vessel formed at the prow into a vertical ram-shaped or knife-edge with a deflector board extending around the prow above the knife-edge and tapering downwardly and rearwardly to the bottom of the hull, but such board was not flared as to its underside, nor was there an outwardly flared portion below the gunwale, and its object was to cause the front of the vessel to lift when it was driven through the water.

Obviously many modifications may be made in the precise formation and shaping of the two concavely flared surfaces, one below the step and one below the deck-line, and the invention is not restricted to the particular formation illustrated in the accompanying drawing.

What I claim as my invention and desire to secure by Letters Patent is:—

1. In a light marine vessel having laterally extending side-wings flared as to their underside at and above the level of the water-line along the fore-part of the vessel, the construction wherein the said side-wings are extended forward and around the nose to meet one another and are flared on the underside of said extension, substantially as described.

2. A light marine vessel having along the forepart of the hull on each side an angular chine which rises from the after end of said chine toward the bow where the two chines meet, a concave surface extending from the chine to meet the hull bottom, and above each chine a concave surface rising from the chine and flared outwardly at the top to meet the gunwale, substantially as described.

3. A light marine vessel having laterally extending side-wings flared as to their underside at and above the level of the water-line along the fore-part of the vessel, said side-wings extending forward and around the nose of the vessel to meet one another and being flared as to the underside of said extension, a concave surface rising from the edges of the steps and their extensions to the gunwale, said surface being flared outwardly at its top and bottom margins, substantially as described.

4. In a flying boat, the combination with a hull of circular or approximately circular cross-section, of a step flared on its underside secured thereon and projecting forward from the nose at a point above the waterline, and extending aft along each side of the vessel with a downward slope across the waterline, and a concave surface extending from the edge of the step to the gunwale, and flared outwardly where it meets them respectively, substantially as described.

In testimony whereof I affix my signature.

HUBERT SCOTT-PAINE.